(No Model.)

A. HAMLIN.
CHURN.

No. 516,305. Patented Mar. 13, 1894.

Witnesses:
John Grist
A. S. Horsey

Inventor:
Alpheus Hamlin
By Henry Grist
Attorney.

THE NATIONAL LITHOGRAPHING COMPANY,
WASHINGTON, D. C.

UNITED STATES PATENT OFFICE.

ALPHEUS HAMLIN, OF ALMONTE, CANADA.

CHURN.

SPECIFICATION forming part of Letters Patent No. 516,305, dated March 13, 1894.

Application filed September 19, 1893. Serial No. 485,768. (No model.) Patented in Canada February 13, 1893, No. 41,949.

*To all whom it may concern:*

Be it known that I, ALPHEUS HAMLIN, of Almonte, in the Province of Ontario, in the Dominion of Canada, have invented certain new and useful Improvements in Churns, (for which I have received a patent in the Dominion of Canada, No. 41,949, dated February 13, 1893;) and I do hereby declare that the following is a full, clear, and exact description of the same, reference being had to the accompanying drawings, in which—

Figure 1:
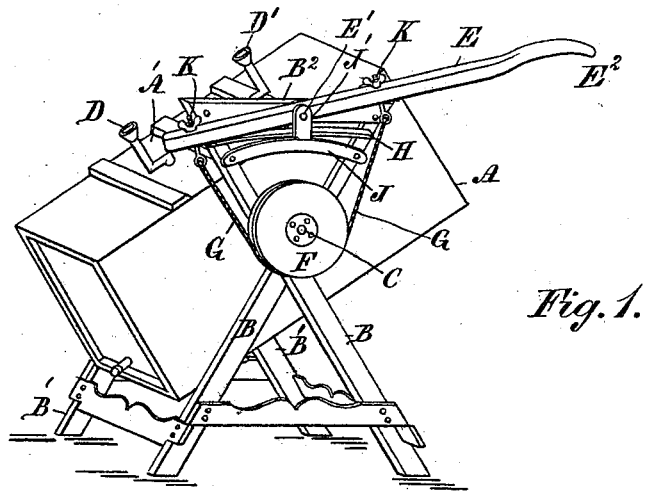
Figure 2:
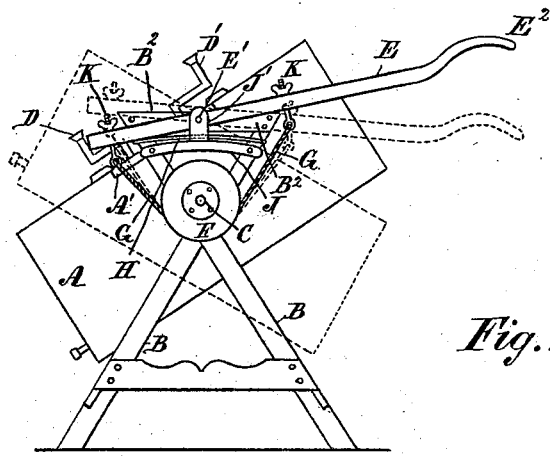
Figure 3:
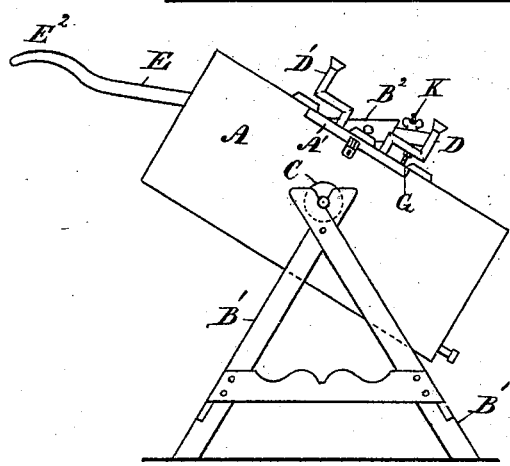

Figure 1, is a perspective view of my improved churn. Fig. 2, is an elevation of one side of the same, and Fig. 3, is a like view of the opposite side.

My invention has for its object to facilitate churning in an easy manner by a tilting motion of the cream chamber by a lever and a wheel and cord gear, and re-actory spring, and tubes to aerate the cream, whereby the motion of the cream in the cream chamber will cause an intake of atmospheric air at the elevated end of the cream chamber and expel the previous intake near the lower end after becoming contaminated during the tilting motion of the churn body.

My invention consists in the construction, combination and application of parts as hereinafter set forth and claimed.

A, is the box or body of the churn or cream chamber provided with a removable cover A', closing the aperture through which the cream is poured into the box or body and the butter extracted. The body preferably is rectangular, approximately a double cube, and internally without breakers or other impediments to obstruct the motion of the cream, whereby the course of the cream in its flow in the cream chamber will be somewhat like that of the figure 8, the return flow intersecting at the middle of the box or body A.

B, is a supporting frame, preferably of two opposite sides each forming a St. Andrew's cross, and connected by stays or bars B'. The churn body A, is supported on said frame B, by trunnions C, secured centrally to opposite sides, and the trunnions bear in the respective crotches of the frame B, so that the churn body A, will freely tilt on said trunnions, or rock thereon.

D, D', are air-tubes, preferably provided with a bend to prevent oversplash, and said tubes enter the cream chamber through the top at a suitable distance from the ends, so that while the churn is being tilted or rocked, the cream in moving causes suction through the uppermost tube and expels the prior intaken air through the lowermost tube, thereby facilitating the production of butter and the removal of offensive and deleterious odors, which if allowed to remain would contaminate the butter and such aeration is effected by the tilting motion while churning and without having to stop the churn.

On one side, the frame A, is provided with a horizontal bar $B^2$, connecting the upper ends of the crossed legs, and to said bar is pivoted by a pin E', a tilting lever E, one or both ends extending past the ends of the churn body and terminating in a suitable handle $E^2$. One of the trunnions C, extends past the crossed legs of frame B, and carries a peripherally grooved wheel F, or suitable rock cam, and around said wheel is wound a cord G, which at the middle is held fixedly to the wheel by a suitably driven staple, and the ends of said cord are secured to the lever E, divergently from the wheel by nutted eye bolts K, or other tension adjusting devices, so that by tilting the lever by hand, the cord will alternately wind on and unwind from the wheel and tilt the churn body or box, as shown in dotted lines in Fig. 2.

J, is a curved bar secured near the ends to the legs of the frame B, and above the wheel F, and to the middle of said bar is affixed a post J', which forms a bearing for the pin E', on which the lever tilts.

H, is a flat spring, which at the middle is clipped to a bracket or bearing projecting from the inner face of bar J, or from the post J', and said spring is preferably slightly curved and may be of wood, metal or steel. The ends of the spring terminate to limit the tilting motion of the lever, and yield to its pressure, and react to give the lever a rebound, reactory or return motion to prevent jar in operation and obtain continuity of action. This mode of tilting a churn in the process of churning reduces labor by the easy leverage obtained from the devices employed, and a churn of this description may be made proportionally larger or smaller to suit the capacity of the dairy, without impairing the effectiveness of the churn.

I claim as my invention—

1. The combination of a churn body A, having air tubes D, D', through the top, a supporting frame B, having a tilting lever E, fulcrumed thereto, a spring H, secured to said frame and located below said lever to yieldingly limit the stroke when tilting the churn body, a wheel F, mounted on a trunnion C, secured to said churn body and mounted on the frame, and a cord G, wound around the periphery of said wheel, the ends of said cord being attached to said lever on opposite sides of the fulcrum, to tilt said churn body, as set forth.

2. The combination with the supporting frame B, and a tilting churn body or box A, carried by trunnions C, of the tilting lever E, fulcrumed to said frame, a wheel F, keyed on one of the trunnions, a cord G, wound around said wheel the ends of said cord being secured to the lever on opposite sides of the fulcrum, and a spring H, intervening said wheel and lever, whereby the ends of the spring will be alternately depressed by the lever to cause reaction, as set forth.

3. The combination with a cross-legged frame B, of the churn body or cream chamber A, internally void of obstructions and provided with air tubes D, D', and mounted on said frame, to tilt, a disk or wheel F, fixed to said churn body, a lever E, fulcrumed to said frame, a cord or rope G, wound around said wheel or disk, the ends connected to said lever by tension screws K, and a spring H, supported at the middle by a bar or bearing intervening said lever and wheel, whereby the ends of the spring receive the impact of the lever when tilted to rock the churn body as set forth.

ALPHEUS HAMLIN.

Witnesses:
JOHN GRIST,
H. H. HORSEY.